US012495103B2

(12) United States Patent
Howarth et al.

(10) Patent No.: US 12,495,103 B2
(45) Date of Patent: Dec. 9, 2025

(54) SIP SERVICES

(71) Applicant: MICROSOFT TECHNOLOGY LICENSING, LLC, Redmond, WA (US)

(72) Inventors: Martin Jack Howarth, London (GB); Matthew James Parkes, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 333 days.

(21) Appl. No.: 18/211,233

(22) Filed: Jun. 16, 2023

(65) Prior Publication Data
US 2024/0422248 A1 Dec. 19, 2024

(51) Int. Cl.
*H04L 69/22* (2022.01)
*G06F 9/54* (2006.01)

(52) U.S. Cl.
CPC .............. *H04L 69/22* (2013.01); *G06F 9/547* (2013.01)

(58) Field of Classification Search
CPC . H04L 69/22; H04L 65/1045; H04L 65/1104; G06F 9/547
See application file for complete search history.

(56) References Cited

U.S. PATENT DOCUMENTS

| | | | | |
|---|---|---|---|---|
| 2009/0070790 A1* | 3/2009 | Gilfix | .................... | G06F 9/4498 719/328 |
| 2010/0042731 A1* | 2/2010 | Sparks | ................ | H04L 65/1104 709/228 |
| 2013/0128883 A1* | 5/2013 | Lawson | .............. | H04M 7/0021 370/352 |

* cited by examiner

*Primary Examiner* — Sun Jong Kim
(74) *Attorney, Agent, or Firm* — Han Gim; Newport IP, LLC (57) ABSTRACT

A method is performed by a session initiation protocol (SIP) user agent or a SIP proxy. A SIP packet is received and parsed into fields. The fields are written into an outbound packet being a protocol packet or a protobuf packet, wherein writing the fields is dependent on an application programming interface (API) for integrating with the SIP user agent or SIP proxy, and wherein the API has restricted functionality as compared with SIP. The outbound packet is sent to a node that implements a service and which has access to the API definition. A response is received and the SIP packet is edited according to fields in the response to produce an edited SIP packet. An action is determined to apply to the edited SIP packet, according to the response. The action is applied to the edited SIP packet.

20 Claims, 5 Drawing Sheets

SIP SERVICES

BACKGROUND

Session initiation protocol (SIP) services such as voice over internet protocol (VoIP) call services, video call services, voice mail and other media communication services are widely used. Creation and deployment of new SIP services is often time consuming and complex.

The embodiments described below are not limited to implementations which solve any or all of the disadvantages of known SIP services.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

Creating SIP services is facilitated by enabling SIP services to be created using HTTP or protobuf through the use of a SIP user agent or SIP proxy. The SIP user agent or SIP proxy has an API which is used to write fields in an outbound packet sent to a node that implements the created service.

In various examples there is a method performed by a session initiation protocol, SIP, user agent or a SIP proxy. A SIP packet is received and parsed into fields. The fields are written into an outbound packet being a transfer protocol packet or a protobuf packet, wherein writing the fields is dependent on an application programming interface (API) for integrating with the SIP user agent or SIP proxy, and wherein the API has restricted functionality as compared with SIP. The outbound packet is sent to a node that implements a service and which has access to the API. A response is received and the SIP packet is edited according to fields in the response to produce an edited SIP packet. An action is determined to apply to the edited SIP packet, according to the response. The action is applied to the edited SIP packet.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Creation and deployment of new SIP services is often time consuming and complex. SIP services are typically implemented as servers that communicate using SIP. These servers are then invoked by an internet protocol multimedia core network subsystem (IMS) core. However, SIP is complex and difficult to use to create new SIP services.

Using the present technology a developer is able to create a new SIP service using a transfer protocol such as hyper-text transfer protocol HTTP, hyper-text transfer protocol secure (HTTPS), interplanetary file system (IPFS), Freenet, ZeroNet, Hypercore protocol or others; or using a protobuf protocol such as remote procedure call (RPC), google remote procedure call (gRPC), Apache Thrift, Ion, Microsoft Bond protocol. Since transfer protocols and protobuf protocols are widely known and are simpler than SIP, efficiencies are gained by creating new SIP services using these protocols.

A developer is able to create a new SIP service using a transfer protocol or a protobuf protocol and "attach" or "connect" the new functionality to a SIP user agent or SIP proxy. The SIP user agent or SIP proxy provides an interface between the new SIP service functionality (created using a transfer protocol or a protobuf protocol) and a SIP communications network; where the interface is more generic than has previously been possible.

The SIP user agent or a SIP proxy connects between a SIP communications network and a new SIP service created by a developer using a transfer protocol such as HTTP or a protobuf protocol such as gRPC. A SIP packet is received by the SIP user agent or SIP proxy and parsed into fields. By receiving SIP packets it is possible to apply the new SIP service to the packets.

The fields are written into an outbound packet being a transfer protocol packet or a protobuf packet, wherein writing the fields is dependent on an application programming interface, API, for integrating with the SIP user agent or SIP proxy. Writing the fields is efficient and enables translation between SIP and the transfer protocol or protobuf protocol. The API is relatively generic as explained in more detail below and the generic nature of the API enables developers to create the new SIP services in a wider variety of manners so as to improve efficiency and robustness.

The outbound packet is sent to a node that implements a service and which has access to the API. In some cases the outbound packet is sent to a node that implements a service and which adheres to the API. The node which implements the service may be a node implementing the new SIP service created by the developer using a transfer protocol or protobuf protocol. Thus the node may process the outbound packet according to the new SIP service created by the developer and generate a response according to the API. The response is sent to the SIP user agent or SIP proxy.

A response is received at the SIP proxy or SIP user agent. The SIP packet is edited according to fields in the response to produce an edited SIP packet. In this way the SIP packet has the new SIP service applied to it. An action is determined to apply to the edited SIP packet, according to the response. The action is applied to the edited SIP packet such as by forwarding the SIP packet to another node in the SIP communications network or by taking other actions.

Figure 1:
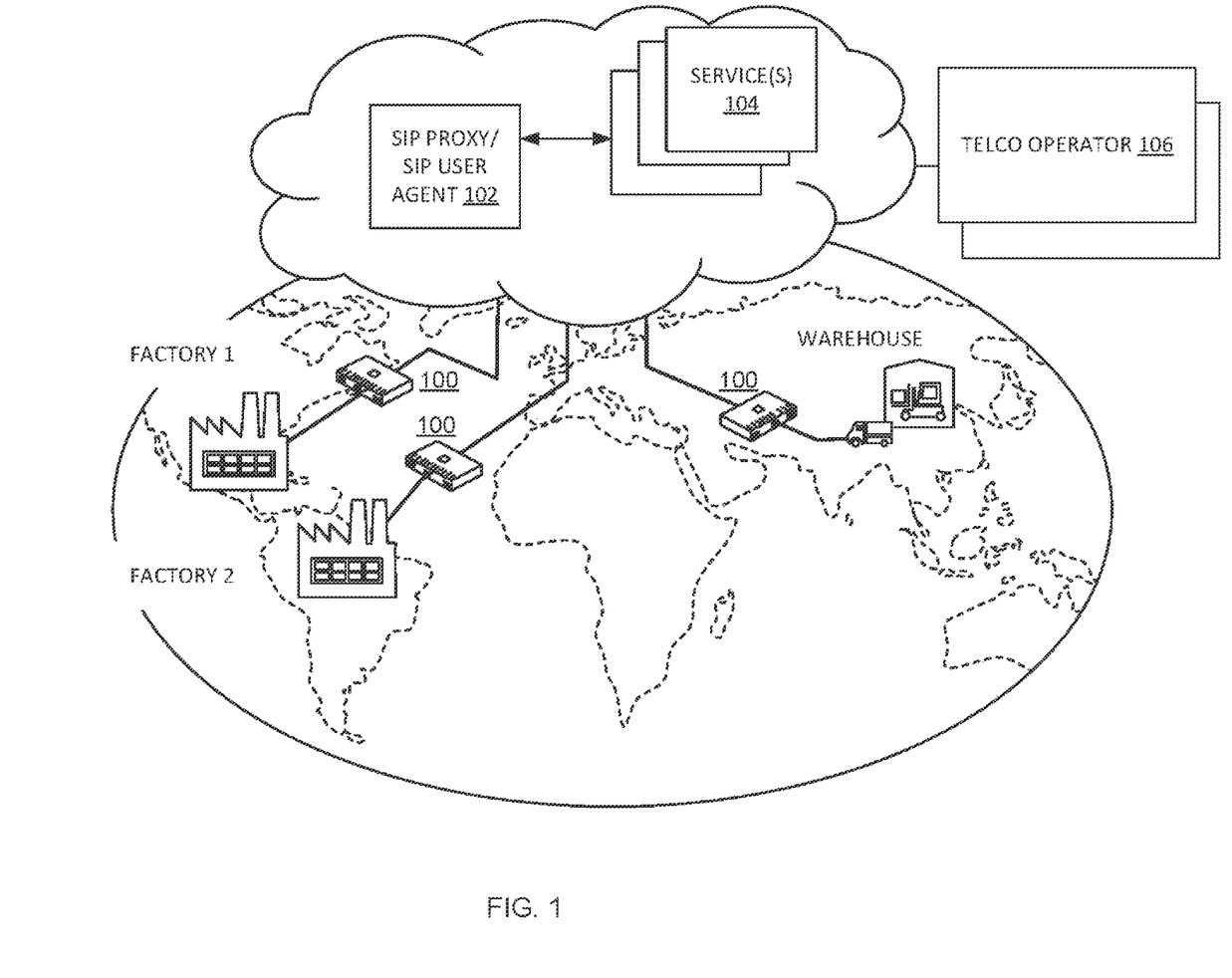
FIG. 1 is a schematic diagram of a SIP proxy or SIP user agent used to deploy a new SIP service.

FIG. 1 is a schematic diagram of a SIP proxy or SIP user agent 102 used to deploy a new SIP service. A telco operator 106 or other party has written software for one or more new services 104 using a transfer protocol or a protobuf protocol. The new services 104 are shown as being deployed in the cloud using one or more communications network nodes such as data centre nodes, compute servers or other nodes. The new services 104 are outside a SIP communications network and are connected to a SIP communications network via the SIP proxy or SIP user agent 102. In this example the SIP proxy or SIP user agent 102 is deployed in the cloud although it is not essential to do so as in some examples the SIP proxy or SIP user agent is on premises. The new service 104 is a SIP service since it is applied to SIP communications packets by the SIP proxy or SIP user agent 102. However, the new service is not written using SIP. The new service 104 is any functionality applied to SIP packets and a non-exhaustive list of examples of service 104 is: message manipulation, routing engine, SIP firewall, robocall blocking, border gateway control function, artificial intelligence-based call blocking.

As shown in FIG. 1 there are one or more local communications networks at separated geographical sites such as factory 1, factory 2 and warehouse. These local communications networks connect to the cloud infrastructure via switches 100. A telco operator 106 providing telecommunications services such as private 5G communications networks to an enterprise spanning the disparate geographical sites may offer a new SIP service 104 to the enterprise. Using the technology described herein the telco operator is able to create the new service 104 simply and efficiently. Note that the example of FIG. 1 is not intended to be limiting and is given to aid understanding of the technology; other deployments are possible. The new service 104 is written by other parties such a cloud infrastructure provider or other party in some cases.

Figure 2:
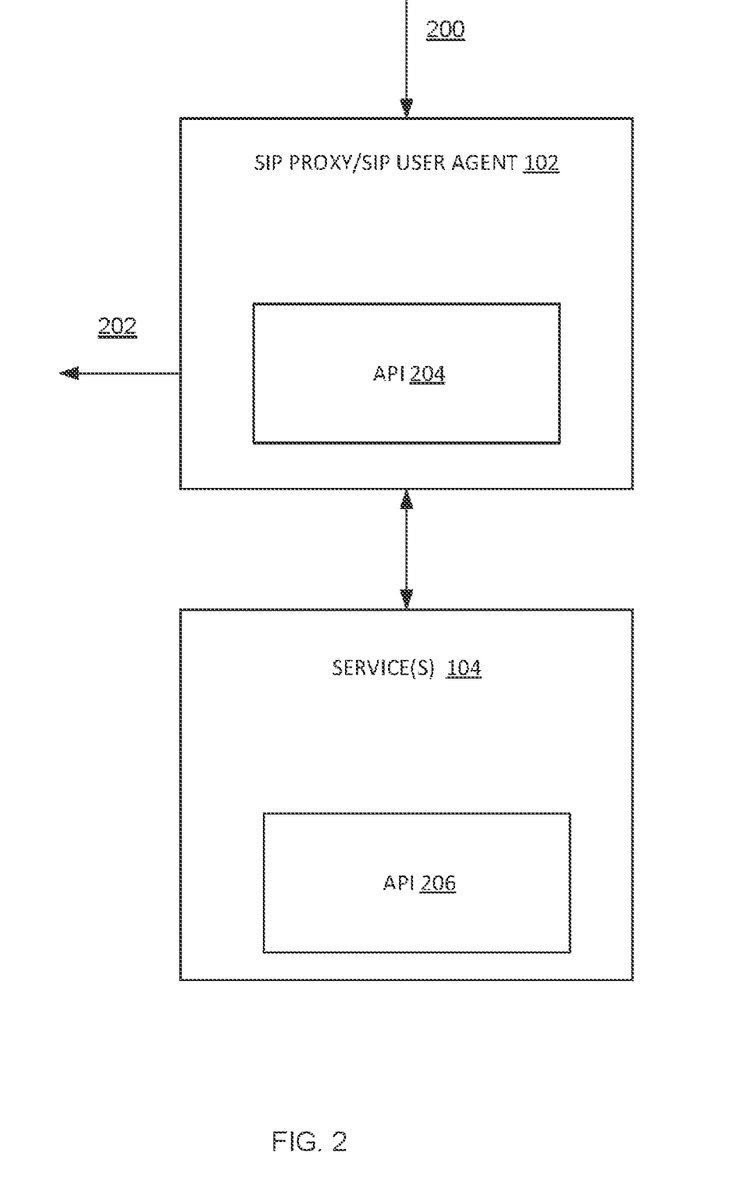
FIG. 2 is a schematic diagram of a SIP proxy or SIP user agent and a node which implements a service.

FIG. 2 is a schematic diagram of a SIP proxy or SIP user agent 102 and a node which implements a service 104. The SIP proxy or SIP user agent 102 is computer implemented using any of software, firmware, hardware and is described in more detail with reference to FIG. 5. The SIP proxy or SIP user agent 102 is connected to a SIP communications network. In an example, the SIP proxy or SIP user agent is deployed in the cloud or in the core of a communications network and receives SIP traffic 200 travelling in a SIP communications network. In an example such as that of FIG. 1 the SIP traffic is from endpoints in sites such as factory 1, factory 2, warehouse or is from other SIP communications nodes in a core of the communications network.

The SIP proxy or SIP user agent 102 is connected to at least one node that provides the new service 104. The connection is any wired or wireless communications link. The node that provides the new service 104 is a data centre node, compute server or other node.

Both the SIP proxy or user agent 102 has an application programming interface 204 and the node providing the new service 104 also has an application programming interface 206. The application programming interfaces 204, 206 are the same; that is the SIP proxy/SIP user agent 102 has an application programming interface 204 which is known to the node providing the new service 104. By using the application programming interface 204, 206 it is possible to translate between SIP and the functionality of the new service in a way which is more generic than has previously been possible.

In various examples, the API 204, 206 has restricted functionality as compared with SIP. In this way complexity of creating the new service is reduced. In some examples the API excludes SIP dialog state. Since SIP dialog state is extremely complex it is possible to significantly reduce the complexity of creating the new service by having the API exclude SIP dialog state.

In some examples the SIP proxy or SIP user agent accesses a definition of data format and methods that the SIP user agent or SIP proxy is able to call on the node that implements the service. In an example the accessed definition is derived from a TypeSpec (trade mark) API definition. Deriving from a TypeSpec API definition is particularly useful since it makes the API more generic and therefore workable with a wider range of programming languages that implement the new service. In an example, the API is derived from a TypeSpec API definition since a TypeSpec definition is used to generate an OpenAPI (trade mark) or gRPC schema.

SIP traffic 200 comprising SIP packets reaches the SIP proxy or SIP user agent 102. The received SIP traffic 200 is from more than one tenant in some cases; that is from more than one telco operator 106 or other party. A SIP packet is used to construct an outbound packet in a transfer protocol or protobuf protocol which is understood by the node providing the service 104. The construction of the outbound packet is done using knowledge of the API 204. The outbound packet is sent to the node providing the new service. The outbound packet is processed by the node providing the new service 104 using functionality to implement the new service which has been written using the transfer protocol or protobuf protocol. Results of the processing are formed into a response which is sent from the node providing the new service 104 to the SIP proxy or SIP user agent 102 by making one or more calls using the API 204.

The SIP proxy or SIP user agent 102 edits the original SIP packet using the response and determines an action to apply to the edited SIP packet according to the response. Examples of actions are forwarding 202 or dropping the edited packet. Where the modified SIP packet is forwarded 202 it is forwarded back into the SIP communications network. As a result the new service has been applied to the SIP packet. In some examples, determining the action is done by reading an action field of the response.

By using the SIP user agent or SIP proxy 102 are able to create SIP services by implementing microservices such as transfer protocol or protobuf microservices. The SIP user agent or SIP proxy 102 is a (multi-tenant) SIP-to-transfer protocol/protobuf protocol service.

In an example, the SIP user agent or SIP proxy receives SIP, converts it to a JavaScript object notation (JSON) body and queries a (configurable) set of HTTP servers and updates the SIP based on the response. Those HTTP servers implement the SIP service.

Protobuf is used in some examples, (e.g. gRPC) for higher performance use cases.

By using the SIP user agent or SIP proxy as described herein complexity and time-to-market for creating new services is reduced. HTTP is less complex than SIP and is widely used. There are more HTTP stacks than SIP stacks, allowing a wider choice of languages and frameworks in which to create SIP services than before. The separation of SIP processing and service functionality for the new service means they can be developed independently which facilitates modular architectures and hence robustness and ease of maintenance.

The SIP proxy or SIP user agent 102 is deployable either as a first party (1P) cloud platform for multi-tenant use cases, and enterprises to deploy on-prem for a single-tenant use case. Telcos or enterprises then write their own HTTP or protobuf or other apps to deploy and connect to it to provide the new SIP service. The SIP proxy or SIP user agent 102 is cloud-native in some examples, allowing for quicker time to market and experimentation than traditional on-prem/hardware-based solutions. Developers are enabled to create SIP services based on cloud functions meaning they are enabled for the first time to define their own SIP services without needing to worry about lifecycle management, or even defining more than a single function (i.e., not even running a HTTP stack).

Figure 3:
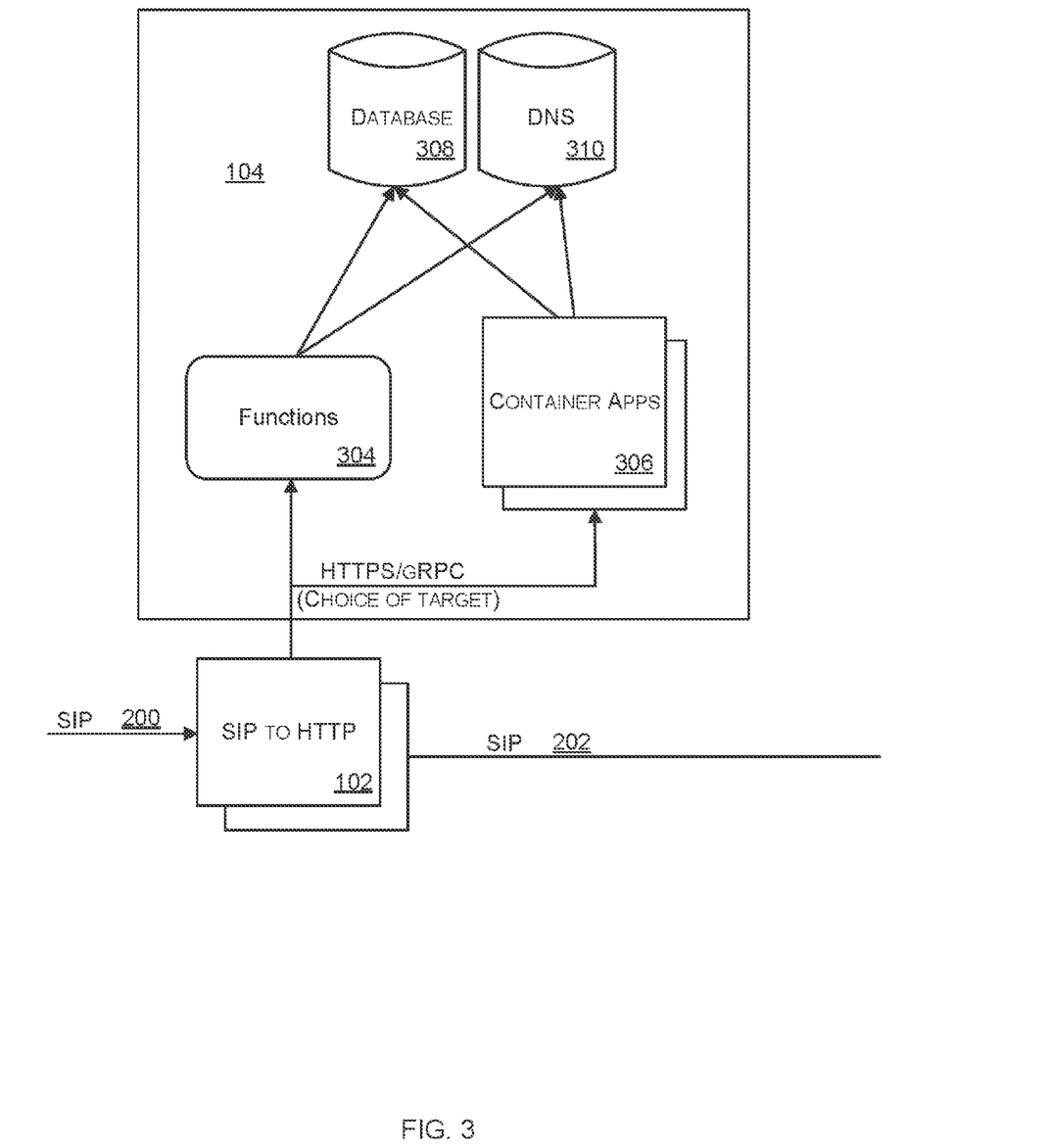
FIG. 3 is a schematic diagram of another SIP proxy or SIP user agent and a plurality of nodes which implement a service.

FIG. 3 is a schematic diagram of another SIP proxy or SIP user agent 102 and a plurality of nodes which implement a service 104.

As in FIG. 2 the SIP proxy or SIP user agent 102 receives SIP traffic 200, edits the SIP packets in the SIP traffic according to responses received from the nodes implementing the new service 104 and forwards the edited SIP traffic 202 (or drops SIP packets).

In the example of FIG. 3 rather than having a single node implementing the new service 104 there are a plurality of nodes performing that function including cloud function node 304, container application nodes 306, database 308 and domain name server DNS 310. The SIP proxy or SIP user agent 102 is connected to both the cloud function node 304 and the container application nodes 306. The cloud function node 304 and the container application nodes 306 are both connected to the database 308 and the DNS 310.

FIG. 3 is an example where the SIP user agent or SIP proxy 102 provides a first party cloud platform for multi-tenant use cases.

In the example of FIG. 3 the SIP user agent or SIP proxy 102 translates from SIP to HTTP and the cloud function node 304 and the container application nodes 306 execute HTTP code to provide the new service 104.

The arrangement of FIG. 3 is modified in some cases by omitting the cloud function node 304; or by omitting one or more of the container application nodes 306. The arrangement of FIG. 3 is modified in some cases by replacing HTTP by gRPC or any other transfer protocol or protobuf protocol.

Figure 4:
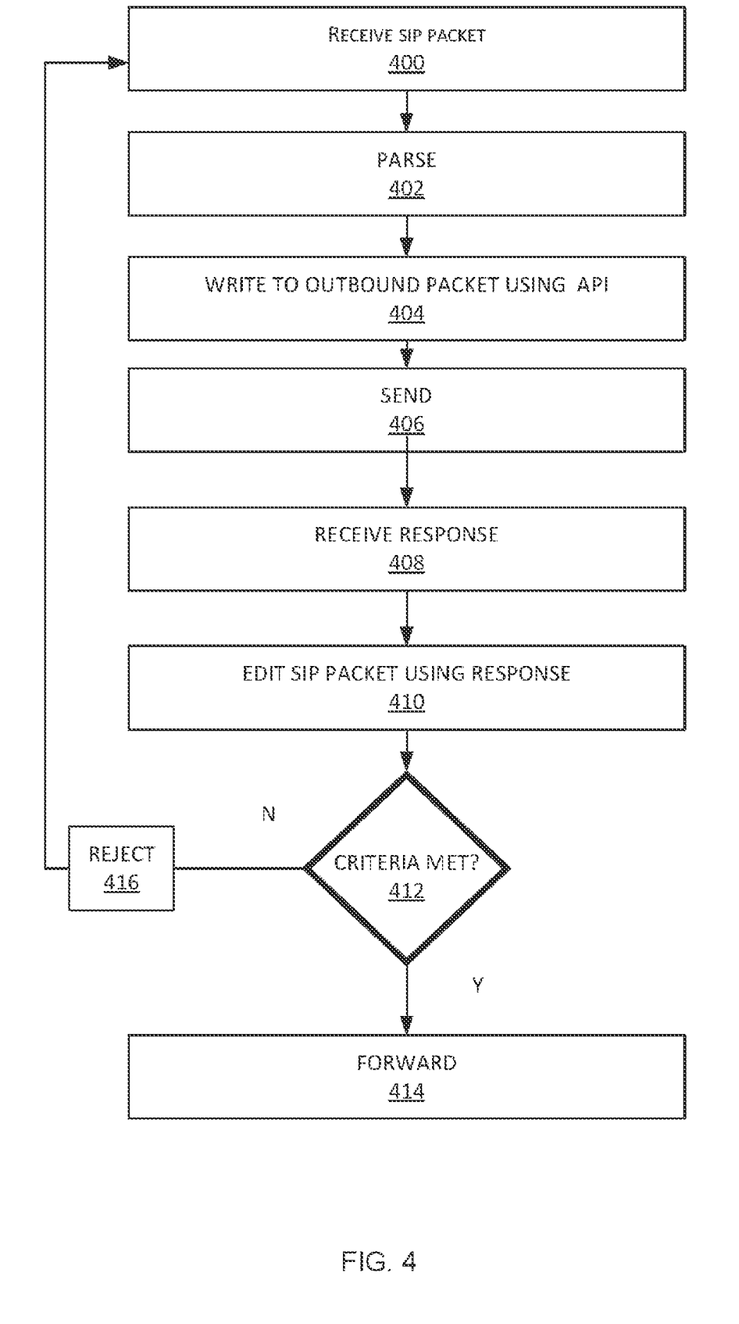
FIG. 4 is a flow diagram of a method performed by a SIP proxy or SIP user agent such as that of FIGS. 1 to 3.

FIG. 4 is a flow diagram of a method performed by a SIP proxy or SIP user agent such as that of FIGS. 1 to 3. The SIP proxy or SIP user agent receives 400 a SIP packet. The SIP packet is received from another node in a SIP communications network such as a router, firewall, switch or other communications network node. The SIP packet is parsed 402 into fields. A non-exhaustive list of example fields which are parsed from the SIP packet is: header fields, to URI, from URI, request URI, body. The fields are written 404 into an outbound packet. The outbound packet is a transfer protocol (e.g. HTTP) or a protobuf packet. The fields are written into the outbound packet in a way which is dependent on the application programming interface 204; that is the fields are written so that one or more of the fields are calls to the API 204, 206 of the node(s) providing the new service. The API is an OpenAPI or gRPC schema generated from a TypeSpec API definition in some cases. That is, the API is generated from or derived from a TypeSpec API definition in some cases which gives a benefit a more generic nature.

The outbound packet is sent 406 to the node(s) 104 providing the new service. In this way calls to the API 206 are received and trigger processing by the node(s) 104 providing the new service. As a result of the processing a response is generated and sent to the SIP user agent or SIP proxy by making calls to the API 204 at the SIP user agent or SIP proxy 102.

The SIP user agent or SIP proxy 102 edits 410 the original SIP packet received at operation 400 on the basis of the response. In this way the new service is applied to the SIP packet. The SIP proxy or SIP user agent checks if criteria are met 412. If not the edited SIP packet is rejected 416 (i.e. dropped) and the process moves back to operation 400 to deal with a next SIP packet in a stream of SIP packets arriving to the SIP user agent or SIP proxy 102.

If the criteria are met at operation 412 the edited SIP packet is forwarded 414 in the SIP communications network.

The assessment of the criteria 412 comprises inspecting or reading an action field of the response in some cases to determine whether to drop the edited packet or to forward it.

Figure 5:
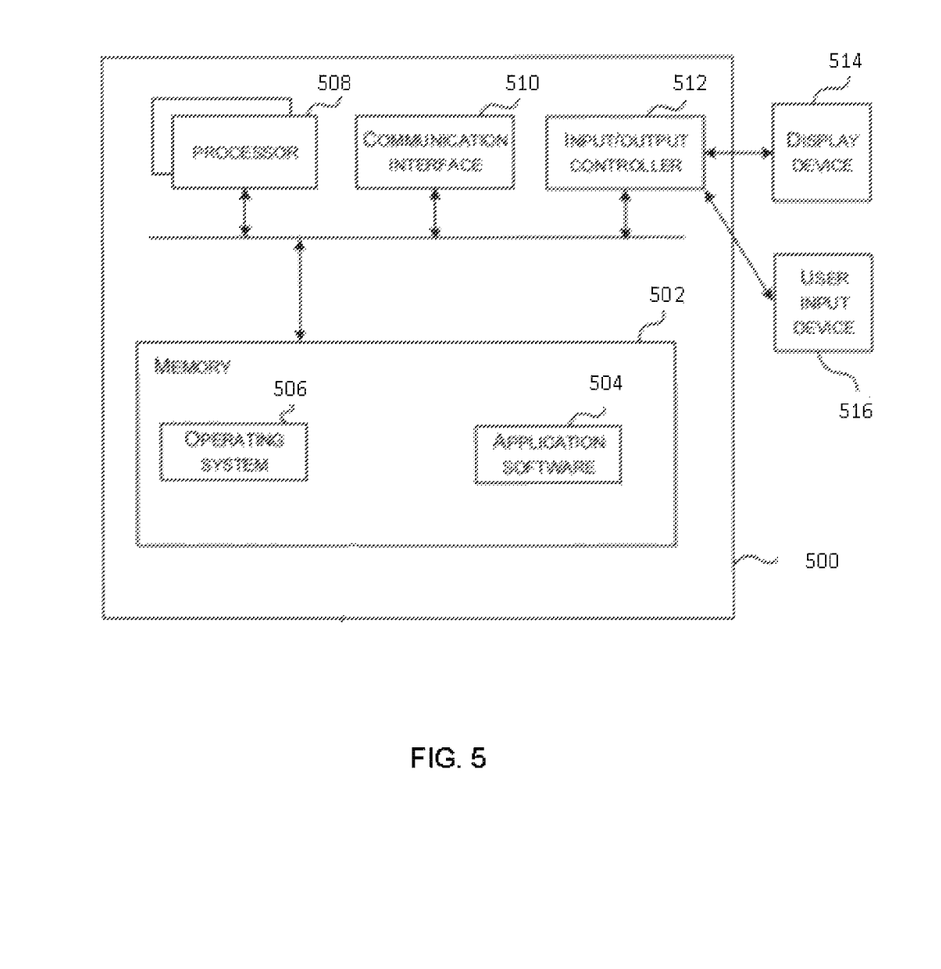
FIG. 5 illustrates an exemplary computing-based device in which a SIP user agent or SIP proxy is implemented.

FIG. 5 illustrates an exemplary computing-based device 500 in which a SIP user agent or SIP proxy is implemented.

Computing-based device 500 comprises one or more processors 508 which are microprocessors, controllers or any other suitable type of processors for processing computer executable instructions to control the operation of the device in order to receive SIP messages, use an API to communicate with nodes providing a service, edit SIP messages according to responses received at the API and forward or drop SIP messages. In some examples, for example where a system on a chip architecture is used, the processors 508 include one or more fixed function blocks (also referred to as accelerators) which implement a part of the method of any of FIGS. 1 to 4 in hardware (rather than software or firmware). Platform software comprising an operating system 506 or any other suitable platform software is provided at the computing-based device to enable application software 504 to be executed on the device.

The computer executable instructions are provided using any computer-readable media that is accessible by computing-based device 500. Computer-readable media includes, for example, computer storage media such as memory 502 and communications media. Computer storage media, such as memory 502, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 502) is shown within the computing-based device 500 it will be appreciated that the storage is, in some examples, distributed or located remotely and accessed via a network or other communication link (e.g. using communication interface 510).

The computing-based device 500 also comprises an input/output controller 512 arranged to output display information to an optional display device 514 which may be separate from or integral to the computing-based device 500. The display information may provide a graphical user interface. The input/output controller 512 is also optionally arranged to receive and process input from one or more devices, such as a user input device 513 (e.g. a mouse, keyboard, camera, microphone or other sensor).

Alternatively or in addition to the other examples described herein, examples include any combination of the following clauses:

Clause A. A computer implemented method performed by a session initiation protocol, SIP, user agent or a SIP proxy comprising:
    receiving a SIP packet;
    parsing the SIP packet into fields;
    writing the fields into an outbound packet being a transfer protocol packet or a protobuf packet, wherein writing the fields is dependent on an application programming interface, API, for integrating with the SIP user agent or SIP proxy, and wherein the API has restricted functionality as compared with SIP;
    sending the outbound packet to a node that implements a service and which has access to the API;
    receiving a response;
    editing the SIP packet according to fields in the response to produce an edited SIP packet;
    determining an action to apply to the edited SIP packet, according to the response;
    and applying the action to the edited SIP packet.

Clause B. The method of clause A wherein the API comprises an OpenAPI or gRPC schema.

Clause C. The method of clause A or B wherein the API excludes SIP dialog state.

Clause D. The method of any preceding clause comprising accessing a definition of data format and methods that the SIP user agent or SIP proxy is able to call on the node that implements the service.

Clause E. The method of clause D wherein the accessed definition is derived from a TypeSpec API definition.

Clause F. The method of any preceding clause comprising using the node to implement a service selected from any of: message manipulation, routing engine, SIP firewall, robocall blocking, border gateway control function, artificial intelligence-based call blocking.

Clause G. The method of any preceding clause wherein the response comprises an action field and wherein determining the action comprises reading the action field of the response.

Clause H. The method of any preceding clause comprising using the node that implements the service to process the outbound packet thereby producing an outcome and to send a response comprising the outcome to the SIP user agent or SIP proxy.

Clause I. The method of clause H comprising, using the node that implements the service to process the outbound packet to apply any of: message manipulation, routing engine functionality, SIP firewall functionality, robocall blocking, border gateway control function, artificial intelligence-based call blocking.

Clause J. The method of any preceding clause wherein the individual fields comprise: header, to URI, from URI, request URI, SIP body.

Clause K. A session initiation protocol SIP user agent, or SIP proxy comprising:
    a processor;
    a memory storing instructions that, when executed by the processor, perform a method comprising:
    receiving a SIP packet;
    parsing the SIP packet into fields;
    writing the fields into an outbound packet being a transfer protocol packet, or a protobuf packet, wherein writing the fields is done according to an application programming interface, API, having restricted functionality as compared with SIP;
    sending the outbound packet to a non-SIP node comprising the API, the non-SIP node implementing a service;
    receiving a response from the non-SIP node;
    editing the SIP packet according to fields in the response to produce an edited SIP packet;
    determining an action to apply to the edited SIP packet, according to the response; and
    applying the action to the edited SIP packet.

Clause L. The SIP user agent or SIP proxy of clause K wherein the API comprises an OpenAPI or gRPC schema.

Clause M. The SIP user agent or SIP proxy of clause K or L wherein the AIP excludes SIP dialog state.

Clause N. The SIP user agent or SIP proxy of any of clauses K to M comprising accessing a definition of data format and methods that the SIP user agent or SIP proxy is able to call on the node that implements the service Clause O. The SIP user agent or SIP proxy of clause N wherein the accessed definition is derived from a TypeSpec API definition.

Clause P. The SIP user agent or SIP proxy of any of clauses K to O comprising using the node to implement a service selected from any of: message manipulation, routing engine, SIP firewall, robocall blocking, border gateway control function, artificial intelligence-based call blocking.

Clause Q. The SIP user agent or SIP proxy of any of clauses K to P wherein the response comprises an action field and wherein determining the action comprises reading the action field of the response.

Clause R. The SIP user agent or SIP proxy of any of clauses K to Q comprising using the node that implements the service to process the outbound packet thereby producing an outcome and to send a response comprising the outcome to the SIP user agent or SIP proxy.

Clause S. The SIP user agent or SIP proxy of clause R comprising, using the node that implements the service to process the outbound packet to apply any of: message manipulation, routing engine functionality, SIP firewall functionality, robocall blocking, border gateway control function, artificial intelligence-based call blocking.

Clause T. A communications network comprising a SIP user agent or SIP proxy, the SIP user agent or SIP proxy comprising a processor and a memory storing instructions which when executed by the processor perform a method comprising:
    receiving a SIP packet;
    parsing the SIP packet into fields;
    writing the fields into an outbound packet being a hypertext transfer protocol, HTTP, or protobuf packet, wherein writing the fields is dependent on an application programming interface, API, for integrating with the SIP user agent or SIP proxy, wherein the API excludes SIP dialog state;

sending the outbound packet to a node that implements a service and which has access to the API;
receiving a response;
editing the SIP packet according to fields in the response to produce an edited SIP packet;
determining an action to apply to the edited SIP packet, according to the response;
and applying the action to the edited SIP packet.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer implemented method performed by a session initiation protocol (SIP) user agent or a SIP proxy, the method comprising:
    receiving a SIP packet;
    parsing the SIP packet into fields;
    writing the fields into an outbound packet as a transfer protocol packet or a protobuf packet, wherein writing the fields is dependent on an application programming interface (API) for integrating with the SIP user agent or SIP proxy, and wherein the API has restricted functionality as compared with SIP, and wherein the API excludes SIP dialog state;
    sending the outbound packet to a node that implements a service and which has access to the API;
    receiving a response;
    editing the SIP packet according to fields in the response to produce an edited SIP packet;
    determining an action to apply to the edited SIP packet, according to the response; and
    applying the action to the edited SIP packet.

2. The method of claim 1, wherein the API comprises an OpenAPI or gRPC schema.

3. The method of claim 1, further comprising accessing a definition of data format and methods that the SIP user agent or SIP proxy is able to call on the node that implements the service.

4. The method of claim 3, wherein the accessed definition is derived from a TypeSpec API definition.

5. The method of claim 1, further comprising using the node to implement the service selected from any of: message manipulation, routing engine, SIP firewall, robocall blocking, border gateway control function, or artificial intelligence-based call blocking.

6. The method of claim 1, wherein the response comprises an action field and wherein determining the action comprises reading the action field of the response.

7. The method of claim 1, further comprising using the node that implements the service to process the outbound packet, thereby producing an outcome and sending the response comprising the outcome to the SIP user agent or SIP proxy.

8. The method of claim 7, further comprising using the node that implements the service to process the outbound packet to apply any of: message manipulation, routing engine functionality, SIP firewall functionality, robocall blocking, border gateway control function, or artificial intelligence-based call blocking.

9. The method of claim 1, wherein the fields comprise: header, to URI, from URI, request URI, and SIP body.

10. A system implementing a session initiation protocol (SIP) user agent or SIP proxy, the system comprising:
- a processor;
- a memory storing instructions that, when executed by the processor, cause the system to perform operations comprising:
- receiving a SIP packet;
- parsing the SIP packet into fields;
- writing the fields into an outbound packet as a transfer protocol packet, or a protobuf packet, wherein writing the fields is done according to an application programming interface (API) having restricted functionality as compared with SIP;
- sending the outbound packet to a non-SIP node comprising the API, the non-SIP node implementing a service;
- receiving a response from the non-SIP node;
- accessing a definition of data format and methods that the SIP user agent or SIP proxy is able to call on the node that implements the service;
- editing the SIP packet according to fields in the response to produce an edited SIP packet;
- determining an action to apply to the edited SIP packet, according to the response; and
- applying the action to the edited SIP packet.

11. The system of claim 10, wherein the API comprises an OpenAPI or gRPC schema.

12. The system of claim 10, wherein the API excludes SIP dialog state.

13. The system of claim 10, wherein the accessed definition is derived from a TypeSpec API definition.

14. The system of claim 10, further comprising instructions that, when executed by the processor, cause the system to perform operations comprising using the node to implement the service selected from any of: message manipulation, routing engine, SIP firewall, robocall blocking, border gateway control function, or artificial intelligence-based call blocking.

15. The system of claim 10, wherein the response comprises an action field and wherein determining the action comprises reading the action field of the response.

16. The system of claim 10, further comprising instructions that, when executed by the processor, cause the system to perform operations comprising using the node that implements the service to process the outbound packet, thereby producing an outcome and sending the response comprising the outcome to the SIP user agent or SIP proxy.

17. The system of claim 16, further comprising instructions that, when executed by the processor, cause the system to perform operations comprising using the node that implements the service to process the outbound packet to apply any of: message manipulation, routing engine functionality, SIP firewall functionality, robocall blocking, border gateway control function, or artificial intelligence-based call blocking.

18. A communications network implementing a SIP user agent or SIP proxy, the communications network comprising a computing device having a processor and a memory storing instructions which when executed by the processor, cause the computing device to perform operations comprising:
- receiving a SIP packet;
- parsing the SIP packet into fields;
- writing the fields into an outbound packet as a hyper-text transfer protocol (HTTP) or protobuf packet, wherein writing the fields is dependent on an application programming interface (API) for integrating with the SIP user agent or SIP proxy, wherein the API excludes SIP dialog state;
- sending the outbound packet to a node that implements a service and which has access to the API;
- receiving a response;
- editing the SIP packet according to fields in the response to produce an edited SIP packet;
- determining an action to apply to the edited SIP packet, according to the response; and
- applying the action to the edited SIP packet.

19. The communications network of claim 18, wherein the API comprises an OpenAPI or gRPC schema.

20. The communications network of claim 18, further comprising instructions which when executed by the processor, cause the computing device to perform operations comprising accessing a definition of data format and methods that the SIP user agent or SIP proxy is able to call on the node that implements the service.

* * * * *